United States Patent
Hammel et al.

(10) Patent No.: US 9,561,957 B2
(45) Date of Patent: Feb. 7, 2017

(54) USE OF A PROCESS FOR HYDROGEN PRODUCTION

(71) Applicant: BESTRONG INTERNATIONAL LIMITED, Wanchai (HK)

(72) Inventors: Ernst Hammel, Vienna (AT);
Klaus-Dieter Mauthner, Vienna (AT);
Walter Brichta, Vienna (AT)

(73) Assignee: BESTRONG INTERNATIONAL LIMITED, Wanchai (HK)

( * ) Notice: Subject to any disclaimer, the term of this patent is extended or adjusted under 35 U.S.C. 154(b) by 172 days.

(21) Appl. No.: 14/310,110

(22) Filed: Jun. 20, 2014

(65) Prior Publication Data

US 2014/0328749 A1 Nov. 6, 2014

Related U.S. Application Data

(62) Division of application No. 12/092,231, filed as application No. PCT/AT2006/000441 on Oct. 27, 2006, now abandoned.

(30) Foreign Application Priority Data

Oct. 31, 2005 (AT) .................. A17892005
Sep. 5, 2006 (AT) .................. A14782006

(51) Int. Cl.
*C01B 3/26* (2006.01)
*B82Y 30/00* (2011.01)
(Continued)

(52) U.S. Cl.
CPC ............... *C01B 3/26* (2013.01); *B01J 12/005* (2013.01); *B01J 23/755* (2013.01); *B01J 23/882* (2013.01); *B01J 37/033* (2013.01); *B01J 37/035* (2013.01); *B82Y 30/00* (2013.01); *B82Y 40/00* (2013.01); *C01B 3/28* (2013.01); *C01B 3/382* (2013.01); *C01B 31/0226* (2013.01); *C01B 31/0293* (2013.01); *B01J 2523/00* (2013.01);
(Continued)

(58) Field of Classification Search
CPC combination set(s) only.
See application file for complete search history.

(56) References Cited

U.S. PATENT DOCUMENTS 2,075,101 A * 3/1937 Dreyfus ................. C10G 1/086
208/419
2,517,339 A * 8/1950 Offutt ........................ B01J 8/10
202/118
(Continued)

FOREIGN PATENT DOCUMENTS

CA 2141065 C 5/1999
CN 1586718 3/2005
(Continued)

*Primary Examiner* — Kaity Handal
(74) *Attorney, Agent, or Firm* — Heslin, Rothenberg, Farley & Mesiti, P.C.; Kellie S. Fredericks; Melvin Li

(57) ABSTRACT

The present invention relates to the use of a process for hydrogen production in which at least a part of a hydrocarbonaceous feed gas (a) is passed into a reformer (c), wherein the feed gas is contacted in the reformer with a catalyst and the feed gas is converted to hydrogen and solid carbon, for the direct production of a hydrogenous gas at filling stations for sale to a consumer, and also to a reactor (d) for hydrogen production.

21 Claims, 9 Drawing Sheets

(51) Int. Cl.
*B82Y 40/00* (2011.01)
*B01J 23/882* (2006.01)
*C01B 3/28* (2006.01)
*C01B 3/38* (2006.01)
*C01B 31/02* (2006.01)
*B01J 12/00* (2006.01)
*B01J 37/03* (2006.01)
*B01J 23/755* (2006.01)

(52) U.S. Cl.
CPC ............... *C01B 2203/0233* (2013.01); *C01B 2203/0277* (2013.01); *C01B 2203/043* (2013.01); *C01B 2203/044* (2013.01); *C01B 2203/047* (2013.01); *C01B 2203/085* (2013.01); *C01B 2203/0833* (2013.01); *C01B 2203/1047* (2013.01); *C01B 2203/1052* (2013.01); *C01B 2203/1082* (2013.01); *C01B 2203/1241* (2013.01); *C01B 2203/142* (2013.01); *Y02P 20/129* (2015.11)

(56) References Cited

U.S. PATENT DOCUMENTS

| | | | | |
|---|---|---|---|---|
| 3,997,689 A * | 12/1976 | Hervert | ............... | B01J 8/382 252/502 |
| 4,040,794 A * | 8/1977 | Stone | ............... | C10G 35/12 208/169 |
| 4,191,736 A * | 3/1980 | Chay | ............... | B01J 19/002 261/92 |
| 5,102,647 A * | 4/1992 | Yamada | ............... | B82Y 30/00 423/447.3 |
| 6,660,680 B1 * | 12/2003 | Hampden-Smith | ...... | B01J 2/003 257/E21.304 |
| 6,878,360 B1 * | 4/2005 | Ohsaki | ............... | B82Y 30/00 239/418 |
| 7,582,275 B1 * | 9/2009 | Maruyama | ............... | C09C 1/44 423/460 |
| 7,625,482 B1 * | 12/2009 | Hunt | ............... | C10G 55/04 208/133 |
| 2004/0234444 A1 * | 11/2004 | Shaffer | ............... | B82Y 30/00 423/447.3 |
| 2005/0072152 A1 * | 4/2005 | Suzuki | ............... | C01B 3/56 60/649 |
| 2005/0242588 A1 * | 11/2005 | Washington | ............. | B60K 6/32 290/1 A |
| 2005/0252764 A1 * | 11/2005 | Meller | ............... | B63B 35/44 204/242 |
| 2006/0099134 A1 * | 5/2006 | Maruyama | ............. | B82Y 30/00 423/447.1 |
| 2006/0228286 A1 * | 10/2006 | Tada | ............... | B01J 6/008 423/445 R |
| 2006/0257310 A1 * | 11/2006 | Tada | ............... | B82Y 30/00 423/447.3 |
| 2008/0223851 A1 * | 9/2008 | Biris | ............... | B01J 8/0015 219/634 |
| 2008/0263954 A1 * | 10/2008 | Hammel | ............... | B01J 23/882 48/127.9 |

FOREIGN PATENT DOCUMENTS

| | | |
|---|---|---|
| DE | 19933791 A1 | 2/2001 |
| DE | 10107187 A1 | 8/2002 |
| DE | 10241688 A1 | 5/2003 |
| DE | 10201273 A1 | 7/2003 |
| EP | 0805780 B1 | 7/1999 |
| EP | 1623957 B1 | 2/2008 |
| GB | 1044273 | 9/1966 |
| JP | 11228101 | 8/1999 |
| JP | 200281304 | 10/2000 |
| JP | 2002161815 | 6/2002 |
| JP | 2002241772 | 8/2002 |
| JP | 2003118548 | 4/2003 |
| JP | 2003146606 | 5/2003 |
| JP | 2004074061 | 3/2004 |
| JP | 2004236377 | 8/2004 |
| JP | 2004307242 | 11/2004 |
| JP | 2005015286 | 1/2005 |
| JP | 2008529943 | 8/2008 |
| WO | 2005052229 A2 | 6/2005 |

* cited by examiner

| component | Dimen-sion size | max | min | component | Dimen-sion size | max | min | component | Dimen-sion size | max | min |
|---|---|---|---|---|---|---|---|---|---|---|---|
| | | | | Filter | | | | PSA | | | |
| $L_{reactor}$ | mm | 1.500 | | V | Bm³/h | 86 | 73 | 65 | Raw gas | | |
| $L_{cooler}$ | mm | 1.000 | | $c_{dust,in}$ | mg/Nm | 1.000 | | | $H_2$ | V% | 59% | |
| D | mm | 470 | | $c_{dust,out}$ | mg/Nm | 1 | | | $CH_4$ | V% | 40% | |
| $S_{wall}$ | mm | 15 | | p | bara | PN6 | 1.300 | 1.050 | $N_2$ | V% | 0.6% | |
| P | bara | 1.49 | | t | °C | 750 | | | $H_2O$ | V% | 0.3% | |
| t | °C | 750 | | ΔP | bar | | 100 | 50 | CO | V% | 0.1% | |
| $G_{weight}$ | kg | 571 | | $P_{backwash}$ | bara | 3 | | | V | Nm³/h | | 20 | 10 |
| WS | | 1.4841 | | $V_{backwash}$ | Nm³/h | 0.029 | | | P | bara | 16 | |
| Screw conveyor | | | | $T_{cycle}$ | min | 70 | | | t | °C | 40 | |
| L | mm | 2.500 | | $n_{step}$ | | 3 | | | Pure $H_2$ | | | |
| D | mm | 470 | | D | mm | 323 | | | $H_2$ | V% | 99.999% | |
| $n_{channel}$ | | 10 | | L | mm | 2600 | | | V | Nm³/h | | 9.0 | 4.5 |
| $f_{channel}$ | | 250 | | G | kg | 430 | | | P | bara | 15.5 | |
| M | Nm | 140 | 115 | | WS | | 1.4841 | | | t | °C | 42 | |
| $v_{convey}$ | m/s | 0.01 | 0.05 | 0.05 | Raw gas Cooler | | | | Residual gas | | | |
| $N_{screw}$ | min⁻¹ | 2.4 | 12.0 | 1.2 | Gas (raw) | | | | $H_2$ | V% | 26.3 | |
| $P_{screw}$ | W | 4.6 | 23.1 | 2.3 | m | kg/h | | 7.0 | 3.5 | V | Nm³/h | | 11.0 | 5.5 |
| $P_{motor}$ | kW | 0.18 | | $t_{in}$ | °C | | 750 | 600 | P | Bara | 20 | 1 |
| G | kg | 200 | | $t_{out}$ | °C | 20 | | | t | °C | 32 | |
| WS | | 1.4841 | | P | bara | 1.3 | | | L | mm | 1.500 | |
| Airlock | | | | Water (jacket) | | | | | B | mm | 1.200 | |
| m | g/h | | 200 | 40 | m | kg/h | 30 | | | H | mm | 1.600 | |
| V | cm³/h | | 400 | 80 | tin | °C | 15 | | | G | kg | 1.000 | |
| n | min⁻¹ | | | | tout | °C | | 89 | 48 | $H_2$ container | | |
| Heat cable | | | | p | bara | 7 | | | P | bara | PN25 | |
| N | St | 2 | | D | mm | 300 | | | L | mm | 4.000 | |
| P | kW/St | 10 | | L | mm | 300 | | | D | mm | 1.200 | |
| $t_{max,cable}$ | °C | 900 | | G | kg | 30 | | | s | mm | 20 | |
| $s_{isolation}$ | mm | 120 | | WS | | 1.4841 | | | V | m³ | 4.5 | |
| CNT collector | | | | Raw gas compressor | | | | G | kg | 3.267 | |
| D | mm | 450 | | V | Nm³/h | | 25 | 10 | Endgas compressor | | |
| L | mm | 700 | | $P_{in}$ | bara | | 1.4 | 1.1 | V | Nm³/h | | 15 | 5 |
| s | mm | 2 | | $P_{out}$ | bara | | 25 | 15 | $P_{in}$ | bara | | 1.100 | 1.080 |
| V | m³ | 0.173 | | $t_{in}$ | °C | 25 | | | $P_{out}$ | bara | 2 | |
| G | kg | 33 | | $t_{out}$ | °C | | 150 | 25 | $t_{in}$ | °C | | 20 | 5 |
| KAT (catalyst) collector | | | | $P_{motor}$ | kW | 11 | | | $P_{motor}$ | kW | 3 | |
| D | mm | 400 | | L | mm | 1.600 | | | L | mm | 960 | |
| L | mm | 400 | | B | mm | 1.500 | | | B | mm | 730 | |
| s | mm | 3 | | H | mm | 1.400 | | | H | mm | 800 | |
| V | m³ | 0.050 | | G | kg | 700 | | | G | kg | 370 | |
| G | kg | 21 | | | | | | | | | | |

Fig. 8

USE OF A PROCESS FOR HYDROGEN PRODUCTION

CROSS REFERENCE TO RELATED APPLICATIONS

This application is divided from U.S. patent application Ser. No. 12/092,231 derived from International Application No. PCT/AT06/00441 filed on Oct. 27, 2006, content of which is incorporated herein in its entirety.

FIELD OF THE INVENTION

The present invention relates to the field of hydrogen production and its distribution infrastructure.

BACKGROUND OF THE INVENTION

There has been great interest in hydrogen as an energy carrier in the transport sector. Hydrogen is perceived as environmentally friendly, in particular, because no $CO_2$ emissions are caused at its combustion by the end consumer. This view, however, ignores that greenhouse gas emissions are caused during its production and supply. Since energy losses occur at every energy conversion, the hydrogen supply infrastructure is, at present, relatively inefficient due to its complexity. This constitutes an essential disadvantage, in particular, in the spreading of hydrogen technologies for use as fuels, either in fuel cells or in internal combustion engines, as a substitution for non-renewable fossil fuels.

Hydrogen, a colorless and odorless gas that is almost insoluble in water, was discovered by the English scientist Henry Cavendish in 1766. On a laboratory scale, it is produced by the electrolysis of water or by the exposure of zinc or iron to diluted acids. On an industrial scale, it is produced by a two-step method, with CO and $H_2$ being produced in a first step by burning hydrocarbons with steam, and CO being converted to $CO_2$ in a second step by the water gas reaction ($CO+H_2O \rightarrow CO_2+H_2$). Carbon dioxide is then eliminated by scrubbing.

According to estimates of IEA, 95% of today's worldwide hydrogen production originates from carbon-containing raw materials, mostly of fossil origin. Most of the conventional processes convert said carbon to $CO_2$, which escapes into the atmosphere. The knowledge about the influence of greenhouse gases on global climatic changes has now called for a reassessment of these conventional approaches. It may also be anticipated that underground storage of collected $CO_2$, to the extent coupled with conventional steam reforming processes, will not rapidly lead to absolutely clean production of hydrogen from fossil energy carriers.

There are basically two ways of producing hydrogen from hydrocarbons, namely oxidizing conversion and non-oxidizing conversion.

Steam-reforming of natural gas (methane, in the first place), also referred to as SMR, is a very highly developed commercial bulk process, by which 48% of the world's hydrogen production is accomplished. This technology is also feasible with other raw materials such as ethane or naphtha, yet its efficiency will be lower with such higher-molecular substances (C. E. Gregoir Padro and V. Putsche, "Survey of the Economics of Hydrogen Technologies", September 1999, National Renewable Energy Laboratory). The SMR technology is based on the reaction of methane with steam in the presence of a catalyst. On an industrial scale, this process is run at about 800° C. and a pressure of 2.5 MPa. The first process stage comprises the conversion of methane with steam to CO and hydrogen. In the second stage, which is also referred to as water gas reaction, CO is further reacted with steam, thus yielding $CO_2$ and additional hydrogen. With the aid of membranes, the occurring $CO_2$ is separated from the product gas, which is free of other impurities in further process steps. The gas occurring in those steps, which, after all, consists of 60% combustible components, is recycled into the reformer.

With reference to the Kyoto Protocol and various national legislatures aimed at minimizing greenhouse gases, the greatest drawback of the SMR process is its high $CO_2$ emission. To prevent this is the key issue of the present invention. Moreover, the process described herein encompasses the economic conversion of hydrocarbon to hydrogen gas and additionally exploitable fiber-shaped hydrocarbon (nanotubes).

Non-oxidizing methods include the thermal decomposition, also referred to as temperature-induced dissociation, the pyrolysis or the cracking of hydrocarbons to hydrogen and carbon.

The thermal decomposition of natural gas has been carried out for long and constitutes one of the most important processes for the production of carbon black. In this context, natural gas is decomposed at high temperatures ranging from 1200 to 1800° C. to form hydrogen and carbon black, wherein air, oxygen or steam are preferably admixed to both modify the carbon black formed and maintain the reactor temperatures. General literature on this topic can be taken from Monographie, Winnacker-Kuichler, Vol. 3, anorganische Technologie II, 4.sup.th Edition, Carl Hanser Verlag, 1983. A new development relating to the decomposition of methane was recently presented by the Norwegian enterprise Kvaemer, wherein hydrogen and carbon black are produced in a high-temperature plasma (CB&H Prozess, Proc. $12^{th}$ World Hydrogen Energy Conference, Buenos Aires, 697, 1998). Advantages of that plasma-chemical process are its high thermal efficiency (>90%) and the purity of the produced hydrogen (98 vol. %). On the other hand, it is a very energy-intensive process.

In order to reduce the high reaction temperatures, catalyst-supported processes were proposed. There, it turned out those transition metals exhibited high activities in terms of methane decomposition, yet with the drawback of carbon layers depositing on the surfaces of the catalysts. In most cases, the thus formed carbon coat was burned off under air access in order to regenerate the catalyst, which, in turn, resulted in all of the carbon having been converted to $CO_2$ and hydrogen having been the sole product to be utilized.

U.S. Pat. No. 1,868,921, Schmidt et al., reports on the conversion of unsaturated hydrocarbons, preferably ethylene, to carbon black at temperatures of about 600.degree. C. by the aid of nickel or cobalt catalysts applied on diatomaceous earth or ZnO, yet does not mention any appreciable synthesis of hydrogen. U.S. Pat. No. 2,760,847, Oblad et al., deals with the decomposition of low-molecular hydrocarbons for the production of hydrogen by contact reactions on transition metals of groups VI/b and VIII of the Periodic System, which are dispersed in liquid host metal phases. U.S. Pat. No. 3,284,161, Pohlenz et al., describes a process for continuously producing hydrogen by catalytically decomposing gaseous hydrocarbons. Methane is cracked in a catalyst fluidized bed at temperatures of between 815 and 1093° C. That process uses Ni, Fe and Co catalysts, preferably $Ni/Al_2O_3$, which are deposited on carriers. The catalyst coated with carbon is continuously removed from the reactor, and the carbon is burned in a regenerator, whereupon the recovered catalyst is recycled into the reactor.

Ermakova et al. examines the effect of the $SiO_2$ content on Ni and Fe catalysts for the synthesis of carbon filaments, also proposing the efficiency of these catalysts for the preparation of hydrogen [Ermakova et al., Catalysis Today, 77, (2202), 225-235]. The authors report on Ni and Fe—$SiO_2$ catalysts having metal contents of between 85 and 90 wt % and effectively decomposing methane into carbon filaments and hydrogen. The catalyst production comprises a two-stage process, wherein $\alpha$-Ni(OH$_2$) with a large specific surface area is dispersed into an $SiO_2$-containing alcohol and the resulting mixture is calcined at temperatures of up to 700° C. Although the catalyst reduced at 700° C. had the smallest specific surface area (7 m$^2$/g), it exhibited the highest catalytic activity. By way of comparison, the catalyst calcined at 250° C. according to BET had a specific surface area of 400 m$^2$/g. Tests in which methane was catalytically decomposed revealed that methane can be decomposed by 16% with 10 mg catalyst. At a reaction temperature of 550° C. and a volume flow of 20 ml/min methane, the useful life of the catalyst was indicated with 30 hours. Various other catalysts are comprehensively known in the prior art.

In U.S. Pat. No. 6,315,977 B, a method for producing hydrogen and nanotubes is described, in which a hydrocarbon gas is reacted in a reactor including two different zones, said zones differing in terms of temperature and catalyst composition.

JP 2003-146606A describes a method for producing hydrogen, in which hydrocarbons on carbon nanohorns are decomposed to hydrogen and carbon. Such carbon nanohorns constitute alternative catalyst surfaces to metals.

From JP 2004-236377A, a water gas shift reaction catalyst can be taken, which is comprised of a titanium nanotube. Such a catalyst can be used for reducing $NO_x$ from exhaust gases.

Another catalyst for the production of hydrogen is described in JP 2004-074061A. That catalyst is comprised of a carrier based on silica titanium carbon fibers or carbon nano-fibers, which is impregnated with palladium and nickel compounds.

A copper catalyst with a nano-carbon material for the recovery of hydrogen from methanol can be taken from CN 1586718A.

EP 1623957A describes a method for producing hydrogen, by which also nano-carbon compounds occur, wherein an Ni catalyst is preferably used. There is a considerable number of publications dealing with the synthesis of graphite fibers of less than 1 μm diameter, yet far more than 1 μm length. At least some generally acceptable base facts have been established on this topic.

Suitable catalysts are the transition elements of group VIII of the Periodic System, Fe, Ni and Co, which, in the presence of carbon, are able to form $Me_3C$ cementit phases that are metastable in certain temperature ranges. Although there is some kinetic stability, such Me-C systems will only be in a thermodynamic equilibrium if metal and graphite are present as separate phases.

The carbon supplying species must form a stable vapor or gas phase at least in a defined time interval.

The diameter of the catalytically formed fibers or whiskers is directly related to the size of the catalyst particles.

Key technologies required for the breakthrough of hydrogen as a fuel, in addition to the production of hydrogen, also relate to its storage, transport and conversion into energy.

Hydrogen can be stored in large amounts only with energy expenditures, usually either as a gas or as a liquid. Gasometers are used for very large volumes. Medium quantities are stored as a gas in pressure tanks at about 30 bar. Smaller amounts can be filled into high-pressure gas bottles of steel or carbon-fiber-reinforced composite material at, presently, up to 400 bar. Yet, hydrogen can also be stored in liquid form at minus 253° C. All these types of storage involve considerable energy expenditures, both in terms of storage and in terms of maintaining, e.g., a cooled storage tank. The supply of a filling station network may finally be realized by the aid of tank trucks. If hydrogen is stored in high-pressure gas bottles of steel, only very little gas can be transported at a considerable weight. Thus, a 40-ton truck will only be able to transport about 530 kilograms of gaseous hydrogen in steel bottles. By contrast, the transport of deep-frozen liquefied hydrogen in extremely well-insulated, double-walled tank containers is economical even for large volumes. The same 40-ton truck, with the appropriate tank system, will be able to load around 3300 kilograms of liquid hydrogen. As in the case of storage, considerable energy losses will have to be taken into account during transportation. An essential prerequisite for the introduction of hydrogen as a fuel for vehicles is a production and distribution system that must not be more complicated than today's system.

In order to shorten transport paths, U.S. Pat. No. 6,432,283B1 proposes to produce hydrogen from water directly at filling stations through electrolysis. Due to the high energy consumption in the form of electric power during the electrolysis of water, this method is, however, neither economical nor ecological, considering that current is primarily obtained by the combustion of fossil fuels.

Another problem involved in the use of hydrogen as a fuel for motor vehicles is its low energy density as compared to gasoline or diesel. Fuel consumption will consequently be higher, and vehicles will have to be equipped with larger tanks. In order to adjust the energy content of fuel to the respective demand, superior fuels are sought, which are relatively environmentally compatible. Hythane-operated vehicles are regarded as an intermediate stage towards vehicles operated by pure hydrogen. Hythane is a mixture of hydrogen and methane with variable composition portions. From CA 2141065 and EP 0805780B1, a method for producing hythane from methane is known, which has a composition comprising a hydrogen portion of about 5-20%. In a pilot project performed with hythane-operated buses in Montreal, it could be demonstrated that hythane-operated buses were significantly more environmentally compatible than buses operated with natural gas (methane). By that choice of fuel, the NO emission, for instance, was reduced by about 50%. The portion of hydrogen in the fuel amounted to 20 vol % (or 6% of the energy portion) in that project. When classifying hythane, it is also to be considered that pure hydrogen will not burn NON-free per se. Due to the high combustion temperature of hydrogen at a comparable air/fuel ratio, higher NO emissions will actually occur by its utilization in an internal combustion engine (air oxygen). Optimally low NO emissions with the use of hythane can be achieved at a hydrogen portion of between 20 and 30%.

The establishment of a hydrogen-oriented infrastructure is an expensive project. Not only production costs will have to be lowered, but also transport and storage costs will have to be reduced. At present, hydrogen is not able to compete on the market with conventional hydrocarbon-based fuels. It is an object of the present invention to both accelerate this transition and enable the supply of motor vehicles with hydrogen at filling stations. It is a further object to provide a suitable reactor for the production of hydrogen, which can be used at filling stations in an economic manner.

BRIEF SUMMARY OF THE INVENTION

In accordance with the invention, this is achieved by the use of a method for producing hydrogen, in which at least a portion of a hydrocarbon-containing feed gas is conducted into a reformer, wherein the feed gas is contacted with a catalyst in the reformer, wherein the feed gas is reacted to hydrogen and solid carbon compounds, for the direct (in situ) production of a hydrogen-containing gas at a filling station facility (for consumer supply). Depending on the reaction conditions, the hydrogen-containing gas will constitute pure hydrogen or also mixtures such as, e.g. hythane, still containing a defined portion of unreacted feed gas (e.g. natural gas or methane). According to the invention, a hydrogen-enriched gas is produced in the reformer, which, due to the catalytic decomposition of the feed gas, has a hydrogen content of between 5 and 99.99999 vol % as well as a CO and $CO_2$ content of <1 vol %, and which can be intermediately stored at a filling station facility or even directly distributed to a consumer. By the employed method, hydrogen or even hythane can be produced as a function of the production conditions such as, e.g., the catalyst surface area, gas flow and temperature. If the production of pure hydrogen is desired, gas flows having hydrogen contents of about 80 vol % or more can be directly subjected to further gas cleaning so as to finally obtain pure hydrogen. The advantage of this application resides in that the employed method, in addition to producing hydrogen or hythane, will also produce carbon in the form of carbon black. The carbon thus separated in solid form will, therefore, not be discharged into the environment as the greenhouse gas $CO_2$, but can be eliminated by special techniques.

BRIEF DESCRIPTION OF DRAWINGS

FIG. 4 illustrates an embodiment of a filling station according to the invention (Example 3).

FIG. 8: Specifications of the components, and design parameters of the components, of a plant.

DETAILED DESCRIPTION OF THE INVENTION

Figure 1:
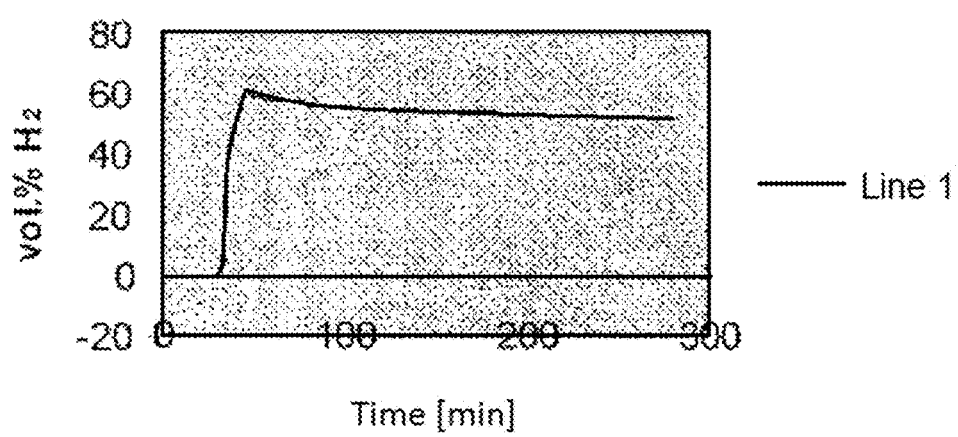
FIGS. 1-3: Attached FIGS. 1 to 3 graphically illustrate the hydrogen concentrations measured in the exhaust gas of the reformer described in Example 2 over a defined time. From all three Figures, it is apparent that a virtually invariably high and stable hydrogen concentration could be reached in the exhaust gas over the entire test period, which is due to a particularly high activity of the Ni composite catalyst used (Example 1).
Figure 2:
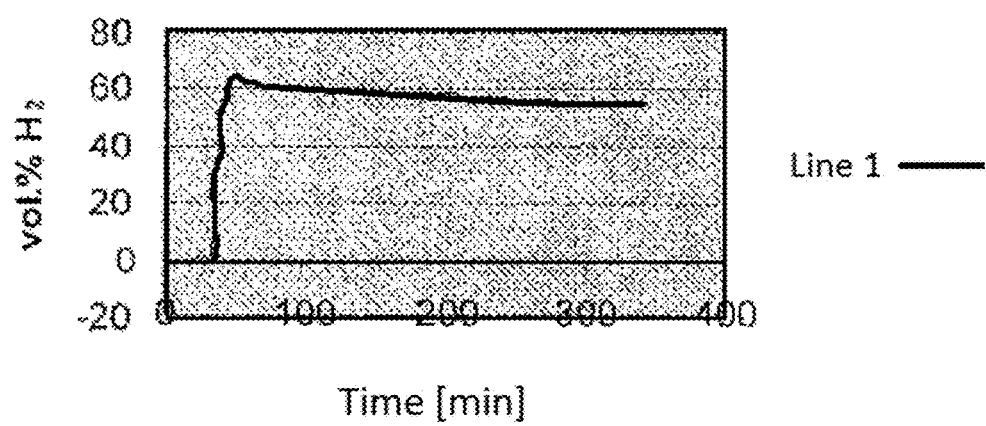
Figure 3:
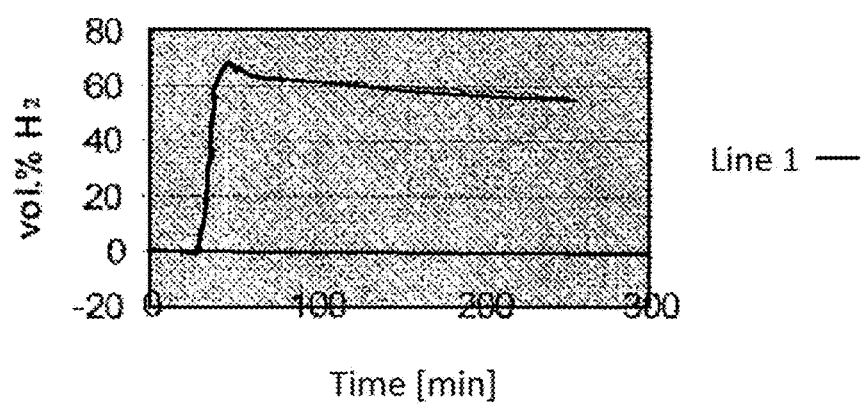

Catalysts suitable for the decomposition of the feed gas to hydrogen and solid carbon, e.g. carbon black, are sufficiently known. In a preferred manner, a nanostructured catalyst on which the feed gas is reacted to hydrogen and nano-carbon in the reformer is, however, used. The production of solid nano-carbons offers a substantial economic advantage apt to accelerate the spreading of hydrogen technology at filling stations. The number of filling stations offering hydrogen is extremely small and, for the time being, only limited to certain company networks. Yet, due to a minimum supply infrastructure, also the demand for hydrogen or hythane-operated motor vehicles is accordingly low. It will only be feasible at considerable financial expenditures to shift this situation in favor of the environmentally friendly hydrogen. An option to stimulate the supply of hydrogen is provided by the present invention. In times of low hydrogen or hythane demand, as will be the case before switching to environmentally friendly fuels, operation costs can be borne by nano-carbon production, with hythane forming a by-product. Nano-carbons such as, for instance, high-quality technical carbon blacks, nanoonions, nano-horns, nano-fibers and/or nanotubes are usable as components in composites, as super-cap materials, as storage media in Li ion accumulators, in field emission displays, in PEM fuel cells, in electronics and as active components in actuators. Currently, polymer, metal-matrix and carbon-carbon composites, field emission cathodes, electrodes and membranes for fuel cell applications are to be especially cited with a view to a product-oriented development. At this time, hythane has, however, already been available at filling stations such that a changeover to hythane-operated vehicles has been made attractive to customers. With the demand for hythane increasing, sufficient hythane-based fuel will be directly formed on site according to the present invention in order to meet the demands without having to rely on expensive pipeline distribution networks or gas transports. At this stage, hythane will ultimately represent the main product claimed, while the nano-carbons occurring in the method according to the invention will form by-products, which will, of course, be utilized even further on and, hence, contribute to cost reductions.

A filling station, in general, comprises fuel storage tanks, a line system, a measuring and dosing device and a dispensing device, e.g. a control unit with options for the customer and a line to a dispensing pistol. A compressor may optionally be used to store the produced hydrogen or hythane in a storage tank under pressure. A further pump to the dispensing system may optionally be omitted on account of the elevated pressure in the storage tank. Alternatively, the produced hydrogen can also be stored intermediately in cooled and liquefied form. To this end, a cooling unit and, preferably, a thermo-insulated storage tank are provided. Filling station systems for the supply of hydrogen are already known in the prior art and can be readily used for the present invention. DE 10107187A1, for instance, describes a filling station for cryogenic media like hydrogen or hythane. There, the fuels are stored in a cooled storage tank and made available through a fuelling device. From DE 10201273A1, a system for filling cars with gaseous fuels and, in particular, hydrogen can be taken. A distribution system for hydrogen fuelling can be taken from DE 10241688A1, and a special embodiment for fuelling hydrogen with oil as an engine-protective additive is known from DE 19933791 A1.

According to the present invention, a system is provided, by which, in preferred embodiments, the produced hydrogen or hythane is intermediately stored in cooled form and/or under pressure.

Alternatively, the produced hydrogen or hythane can be directly transferred to the end customer.

In the method used for the production of hydrogen at filling station facilities, hythane is formed, which is a mixture of hydrogen and unreacted feed gas, preferably methane. For certain motor vehicles, hythane already constitutes the desired end product of the present invention. Pure hydrogen likewise constitutes a requested fuel. In order to obtain pure hydrogen, the emerging gas flows with hydrogen contents of around 80 vol % or more can be directly subjected to further gas cleaning, with pure hydrogen being obtained in the end. At lower $H_2$ concentrations, preferably <80 vol %, it may be provided for the production of pure hydrogen at a filling station, to conduct at least a portion of the exhaust gases from the reformer into a steam reformer, where remaining feed gas will react with steam to form hydrogen. In said steam reformer, the hydrocarbon-containing feed gas reacts with water to form $H_2$ and CO in a first step, and $H_2$ and $CO_2$ in a second step. Under the assumption that methane is decomposed on the catalyst (e.g. Ni) at 600° C., a hot gas mixture enriched with hydrogen and having a composition comprised of 33 vol % methane and 67 vol % $H_2$ will be obtained. This mixture is then fed into the steam reformer, where the remaining 33 vol % $CH_4$ is reacted with steam in the presence of a catalyst to form CO and $H_2$. Compared to a reaction without the primary reformer in which carbon is deposited in solid form, a reduction of the $CO_2$ emission by about 50%, based on the used methane, will result in this example.

The finally occurring $CO_2$, besides other possible reactive substances, is, however, required as a valuable reactant for the oxidation or surface modification of the nano-carbon catalytically produced in the reformer, and hence utilized in a beneficial manner. The oxidizing post-treatment of the nano-carbon is accomplished at temperatures of between 300 and 2000° C. If this oxidation treatment is carried out at a temperature equal to, or higher than, 500° C., $CO_2$ is substantially converted into CO, which, fed into the shift reactor optionally arranged to follow the steam reformer, will again positively contribute to the quantitative yield, based on hydrogen. An additional feed of CO into a shift reactor will, moreover, have positive effects on the energy balance of this component, since the water gas reaction ($CO+H_2O \rightleftharpoons CO_2+H_2$) is known to be strongly exothermic. The (nanostructured) catalyst used according to the invention may, for instance, also be provided in the form of a pressed pellet, which exhibits sufficient porosity to make the entire active surface of the catalyst available to the incoming feed gas.

In a preferred manner, the invention contemplates that the exhaust gases from the reformer are preheated prior to entering the steam reformer, which, amongst others by the high thermal capacity of the already present hydrogen, is easy to achieve and additionally accomplished by the entrainment of considerable amounts of heat from the reformer, thus providing an energetically more favorable operation of the steam reformer.

According to a further embodiment of the present invention, the exhaust gases from the steam reformer are after-burned to remove carbon monoxide. Since, according to the invention, the exhaust gases of the reformer are combined with the exhaust gases from the steam reformer, this is done in a cost-effective manner at a low energy consumption in a shift reactor usually arranged to follow a conventional steam reformer, anyway. The $CO_2$-containing exhaust gas emerging from the shift reactor can, furthermore, be used for the oxidation or surface modification of nano-carbon. The exhausted catalyst covered with nano-carbon can, for instance, be collected in a post-reactor and, there, subjected to an oxidation or surface modification, yet it will also be feasible, if several reformers are provided, to switch between the same and effect such oxidation or surface modification in the reformers respectively loaded with nano-carbon.

It will also be beneficial if the exhaust gases from the reformer are combined with the hydrogen-containing gas mixture emerging from the steam reformer and cooled prior to after-burning in order to avoid a back-reaction of the water gas reaction. The elevated concentration of hydrogen, which is reached on account of the reformer, also allows for an improved heat dissipation of the heat released from the water gas reaction. At the same time, the steam required for the steam reformer can also be generated, or heated, by the cooling process preferably taking place in a heat exchanger.

It is, furthermore, preferred if the catalyst is arranged on a carrier. This will be of particular advantage with nano-structured catalysts. It has been known so far that nano-structured catalysts, if applied on inert materials such as $SiO_2$, MgO, $Al_2O_3$, SiC, graphite etc., are able to catalytically produce extremely thin carbon fibers under the action of temperature.

According to still another embodiment of the present invention, the carrier is a flat carrier, thus readily enabling the utilization of the entire catalytically active surface of the catalyst.

It is preferred if the carrier comprises particle-shaped ceramic bodies or particle-shaped glass bodies, which, on the one hand, have larger surface areas than flat carriers and, on the other hand, can also be used in fluidized beds. Furthermore, particle-shaped carriers will also exhibit higher mechanical stabilities.

It will, moreover, be beneficial if the catalyst in the reformer is continuously supplied and discharged. This will ensure the continuous operation of the reformer while, at the same time, continuously separating, and supplying to further uses, the carbon compounds deposited on the catalyst.

The catalyst and the feed gas are preferably conducted in co-current flow within the reformer. Such guidance will ensure a higher residence time of the feed gas on the catalyst, which will result in enhanced gas utilization and higher conversion rates.

According to still another embodiment of the present invention, the catalyst and the feed gas are conducted in counter-current flow within the reformer. This will accelerate the reduction of the catalyst so as to reach higher efficiencies.

It is, moreover, preferred to contact the feed gas with the catalyst in the reformer at a temperature ranging from 300 to 1400° C. Optimum conditions for the decomposition of the feed gas to hydrogen will prevail within that temperature range. By selecting the appropriate temperature, the growth and structure of nano-carbon can, moreover, be influenced or even controlled.

According to yet another embodiment of the present invention, the feed gas is contacted with the catalyst in the reformer at a temperature ranging from 400 to 700° C. Within that temperature range, Ni composite catalysts, which are preferably used according to the invention, have extremely high efficiencies.

The catalyst is preferably selected from the group consisting of group VIII transition elements. Such catalysts are known per se for the production of nano-carbon.

It will also be beneficial if the catalyst is a composite catalyst comprising a member selected from the group consisting of earth alkali metal oxides, silicon, silicon oxide and mixtures thereof. Such catalysts are particularly suitable for the production of filaments, since the inert component in the interior of the catalyst particle will cause a concentration gradient relative to the carbon meta-stably dissolved in the metal.

It is preferred if nickel, cobalt and/or iron is used as a catalyst. Based on the reaction temperature, an effective range of 300 to 1400° C. will be covered by the catalysts mentioned herein, as a function of the respective composition. According to the invention, the highest efficiency will be achieved by the method with methane used as a hydrocarbon; this also with the background that methane comprises the most favorable C/H ratio and can, moreover, be recovered in sufficient quantities from biological processes so as to ensure the independence from hydrocarbons of fossil origin. Without being fixed to any theory, the catalysts, in terms of basic structure, can readily be specifically efficiently configured for other hydrocarbons as well. Thus, also higher hydrocarbons of alkanes, alkenes, alkines, cyclic hydrocarbons and their thermal decomposition products are absolutely suitable to run through the catalytic decomposition process, provided they exist in the vapor or gas phase under the indicated reaction temperatures. If less value is placed on the degree of purity of the thus produced hydrogen, hydrocarbon gases containing impurities like nitrogen, oxygen and sulfur may also be processed by this method via the reactor. The impurities may be bound both in the air and in the hydro-carbon (e.g. as components of functional groups). Feed gases without such impurities and, in particular, nitrogen impurities amounting to more than 3%, preferably more than 2%, are, however, preferred. It will, thus, be feasible to adjust within wide limits acceptable limit concentrations of the decomposition gas leaving the reactor. This will be achieved by the composition of the feed gas, on the one hand, and by the composition of the catalyst(s), on the other hand. As will be readily understood, the key is in the chemistry to produce nano-carbon using sufficiently catalytically active catalysts. The preparation of such particles, especially with a view to controlling the average diameter distribution, is achieved by precipitating Ni, Fe, Co or any mixtures thereof, from aqueous solutions by adjusting alkaline conditions. Thus are obtained hydroxide precipitates forming very large specific surface areas and, hence, the basis for the nanostructures of the same. Basic reagents used to adjust pH values of 8 or more include both alkali hydroxides, earth alkali hydroxides, earth alkali oxides, ammonia or ammonium hydroxide. If alkali hydroxides are used, it must be taken care that the finished catalyst does no longer contain any alkali metal impurities, since these would affect the activity of the catalyst. The opposite holds for the precipitation with earth alkali hydroxide or earth alkali oxide, since earth alkali oxide as an inert extra component in the composite catalyst will have a positive effect on the catalytic activity of the latter. Thus, composite catalysts with MgO, CaO, MgO/CaO are, inter alia, readily accessible as inert components. In a preferred manner, catalysts as described in EP 1623957 are used and treated.

The catalyst is preferably selected from the group consisting of group VIII transition elements. In particular, the catalyst preferably comprises a composite structure and at least one group VIII transition element component, preferably Fe, Ni, Co, Mo and/or mixtures thereof, particularly preferred MoCo.

In further preferred embodiments, the composite catalyst comprises an inert component preferably selected from oxides and/or hydroxides of earth alkalis, of silicon, aluminum, boron, titanium or mixtures thereof, wherein caustically burnt magnesia and/or freshly precipitated magnesium hydroxide with a specific surface area of >1 $m^2/g$ are particularly preferred. Such catalysts are particularly suitable for the production of filaments from carbon, since the inert component in the interior of the catalyst particle will cause a concentration gradient relative to the carbon meta-stably dissolved in the metal.

The catalyst is preferably a nanostructured catalyst suitable for the production of nano-carbon. As known in the literature, $SiO_2$ exerts a very positive influence on the activity of group VIII transition metals. The central point also with these catalysts is that, departing from the metal hydroxide precipitates produced in situ, the "Si" or $SiO_2$ is united with the hydroxide in a likewise nanostructured manner, either by a parallel precipitation or by an immediately following precipitation.

It is preferred, if nickel, cobalt and/or iron is used as a catalyst. The catalysts preferably used according to the invention are based on Ni, Fe and Co and, in an even more preferred manner, have composite character with a component that is inert relative to the decomposition of hydrocarbon.

The catalyst is, in particular, selected from group VIIIB of the Periodic System and, in addition, comprises an f- or d-transition metal preferably selected from vanadium, chromium, manganese, molybdenum, palladium, platinum, or from the group of rare earth metals.

In a preferred manner, $SiO_2$-containing Co, Ni and Fe catalysts, or Ni, Fe and Ni/Fe-containing hydroxide or oxide powders, are obtained by precipitating $SiO_2$ "on" the metal hydroxide dispersed in water, alcohol, acetone or any other suitable solvent. $SiO_2$ is directly deposited on the hydroxide by the decomposition of tetraoxysilane (TEOS) by the addition of a base (e.g. $NH_3/H_2O$). In a further configuration, substoichiometric $SiO_2$—$Ni(OH)_2$, $SiO_2$—$Fe(OH)_3$ or $SiO_2$—Ni/Fe hydroxides are obtained in one step by the direct, simultaneous precipitation under base addition. Even in that case, it should be noted that the main component of the composite catalyst is the group VIII transition metal, the latter being at least present at a ratio of larger than 50 mol-%, preferably larger than 80 mol-% and, still more preferred, at a ratio of larger than 90 mol-%. If the catalyst components are directly precipitated from organic solvents (e.g. alcohol, acetone, THF, acetonitrile, nitromethane etc.) with both inorganic and organic bases (e.g. NaOH, $NH_3$, $NH_4OH$, TMEDA etc.) being usable as precipitation reagents, precipitates with composite character containing high-molecular silicone compounds, metal hydroxide and metal-Si metal organyls will be obtained. This mixture, which forms the solid deposit, will guarantee very large specific surface areas (>20 $m^2/g$) and, hence, the nanostructures of these composite catalysts.

According to yet another embodiment of the present invention, the catalyst in the reformer is continuously or discontinuously discharged, optionally as a function of the hydrogen content in the exhaust gas, and separated from adhering carbon compounds. After the separation of the nano-carbon, the discharged catalyst is continuously regenerated and/or recycled, and can be used again. In a particularly preferred manner, this method step can proceed automatically.

In doing so, the catalyst is preferably mechanically separated from adhering carbon compounds, preferably by scraping or in a cyclone. This is of particular advantage when using a flat or solid carrier.

It is, moreover, preferred, if the catalyst is chemically separated from adhering carbon compounds, preferably by an etching process. By, for instance, an etching process (acid treatment), the metallic catalysts can be separated and recycled in a simple manner.

It is also suitable, if the catalyst is physically separated from adhering carbon compounds, preferably by high-temperature treatment, heat removal, inductively, by RF or HF. This separation process is particularly gentle for the nanocarbons formed. According to yet a further embodiment of the present invention, natural gas is used as a feed gas. Natural gas is the cheapest and most readily accessible feed gas variant, it is optionally cleaned from sulfur compounds prior to its use.

It is particularly preferred if an optionally prepurified biogas is used as a feed gas. This comes very close to natural gas in its composition and allows for decoupling from fossil energy carriers.

A portion of the feed gas is preferably used as a heating gas for heating the reformer and/or steam reformer. This will favorably influence the energy balance, in particular, if an optionally prepurified biogas is used as a feed gas and available in sufficient quantities.

It is also beneficial if the waste heat from the steam reformer is used for preheating the feed gas for the reformer and/or for heating the reformer. Due to the temperature differences between the two processes (the hydrogen production in the reformer at the simultaneous production of solid carbon compounds taking place at lower temperatures than the hydrogen production in the steam reformer), the utilization of the waste heat from the steam reformer is quite obvious, and it is readily feasible by suitable measures (e.g. a heat exchanger provided between the two reformers).

The composite catalyst preferably used according to the invention can be produced in the following way.

As known in the literature, $SiO_2$ has a highly positive effect on the activity of group VIII transition metals. The central point also with these catalysts is that, departing from the metal hydroxide precipitates produced in situ, the "Si" or $SiO_2$ is united with the hydroxide in a likewise nanostructured manner, either by a parallel precipitation or by an immediately following precipitation.

In accordance with the invention, $SiO_2$-containing metallic catalysts or metal-containing hydroxide or oxide powders are either obtained by precipitating $SiO_2$ "on" the metal hydroxide dispersed in water, alcohol, acetone or any other suitable solvent. $SiO_2$ is directly deposited on the hydroxide by the decomposition of tetraoxysilane (TEOS) by the addition of a base (e.g. $NH_3/H_2O$). In a further configuration, substoichiometric $SiO_2$—$Ni(OH)_2$, $SiO_2$—$Fe(OH)_3$ or $SiO_2$—Ni/Fe hydroxides are obtained in one step by the direct, simultaneous precipitation under base addition. Even in that case, it should be noted that the main component of the composite catalyst is the group VIII transition metal, the latter being at least present at a ratio of larger than 50 mol-%, preferably larger than 80 mol-% and, still more preferred, at a ratio of larger than 90 mol-%. If the catalyst components are directly precipitated from organic solvents (e.g. alcohol, acetone, THF, acetonitrile, nitromethane etc.) with both inorganic and organic bases (e.g. NaOH, $NH_3$, $NH_4OH$, TMEDA etc.) being usable as precipitation reagents, precipitates with composite character containing high-molecular silicone compounds, metal hydroxide and metal-Si metal organyls will be obtained according to the invention. This mixture, which forms the solid deposit, will guarantee very large specific surface areas (>20 m.sup.2/g) and, hence, the nanostructures of these composite catalysts.

After this, the thus synthesized catalyst powder is dried, while avoiding drying temperatures of above 150° C. in order to keep diffusion procedures between the individual components or particles at a minimum, since this might lead to undesired particle aggregations, which would, in turn, necessitate sintering procedures between the individual catalyst particles under operating conditions at high temperatures. This would inevitably restrict the activities of the catalysts in an undesired manner.

Catalysts synthesized by the wet-chemical route described herein additionally contain solvent molecules, which are removed by calcining at higher temperatures. In certain cases, e.g. with catalysts having larger inert portions, it is advantageous to effect calcining at temperatures of up to 1000.degree. C. This process step calls for the formation of individual crystallographic phases, both of the inert component and of the catalytically active metal component. If powder calcining is appropriate, an appreciable degradation of hydroxide to oxide will occur at temperatures of above 150° C., and continue with the temperature increasing. At temperatures of above 350° C., this procedure will be largely completed, and further changes in the catalyst will, thus, have to be attributed to sintering effects. It is advantageous to carry out the calcining process under a reactive atmosphere. By selecting suitable gas atmospheres, both oxides, nitrides, carbides and mixtures of the anion components will be obtainable. If the powder is exposed to a reducing atmosphere at a defined temperature after some time, the inert component will remain unaffected by the reduction with just the transition metal component being reduced to metal.

Such catalysts freed from foreign components (e.g. solvents, thermally unstable anions etc.) are also directly accessible. To this end, Ni, Fe or any transition metal compounds are decomposed in the gas or vapor phase at high temperatures, i.e. temperatures higher than 300° C., along with compounds containing the inert component or its precursor. The decomposition also may take place only on the wall of the heated vessel. The prerequisite here being that compounds be used, which are sufficiently volatile and exist in the gas or vapor phase at least over a short time.

As already pointed out above, the use according to the invention is preferably applied for the production of nanocarbons such as high-quality technical carbon blacks, nanoonions, nanohorns, nanofibers and/or nanotubes, which adhere to the catalyst. The nano-carbons constitute a valuable by-product in the production of hydrogen.

Consumers preferably comprise motor vehicles to which the hydrogen-containing fuel produced is distributed. In accordance with the invention, a method for fuelling consumers is also provided, wherein the fuel is produced in accordance with the use of the invention.

According to a further aspect of the present invention, a filling station facility including a device for the production of a hydrogen-containing gas mixture from a hydrocarbon-containing feed gas comprises an inlet for a hydrocarbon-containing feed gas (a), a reformer (c) comprising a catalyst, an exhaust gas line (j) suitable for hydrogen transport, a compressor or a cooling device (f), and a dispensing device (h) suitable for withdrawing either the hydrogen-containing fluid or the hydrogen-containing gas. By the filling station or filling station facility suitable for fuelling motor vehicles (i), it has now become possible in a simple manner to fill up hydrogen-operated vehicles or vehicles operated by hydrogen mixtures. According to the invention, the expensive transport of hydrogen is also avoided by the $CO_2$-poor in-situ production of the same. The catalyst is preferably comprised of a nanostructured catalyst suitable for the production of nano-carbon. The use according to the present invention further enables the production of a gas mixture with a composition to be selected by the consumer.

The filling station facility preferably comprises a storage tank (g) for either a cooled liquid hydrogen-containing fluid or a hydrogen-containing gas under pressure, or both.

In preferred embodiments, the filling station facility comprises a mixing device (k) for mixing the hydrogen-containing exhaust gas with a hydrocarbon-containing gas. The mixing device in a simple manner enables the preparation and administration of a mixture, e.g. hythane if the hydrocarbon is methane, with a desired hydrogen portion according to the respective demand. The hydrocarbon may, for instance, be present in the form of natural gas or liquefied natural gas or biogas. Mixing may, of course, also be effected elsewhere, for instance directly at the dispensing device (h) during the fill-up of a consumer (i).

In preferred embodiments, the filling station facility comprises a compressor. By a suitable compressor, a hydrogen-containing gas can be compressed for better intermediate storage in a pressure tank.

In a further embodiment, a cooling installation is provided, which is able to convert the exhaust gas from the reformer into a cooled liquid hydrogen-containing fluid.

According to a further preferred embodiment, the reformer (c) comprises a supply and discharge device (cl) for the continuous supply and discharge of the catalyst.

The filling station facility preferably comprises a steam reformer (d) for the production of pure hydrogen.

In a preferred manner, the filling station facility also comprises a measuring and dosing device for the customized fuelling of a consumer.

In order to achieve the objects mentioned in the beginning, the present invention, according to a further aspect, provides a reactor device for the production of hydrogen. Thus, a device for the production of a hydrogen-containing gas is provided, which includes a reactor (or reformer) comprising an inlet for a hydrocarbon-containing feed gas, an inlet for a catalyst suitable for cracking hydrocarbons to form hydrogen and solid carbon, a reactor zone comprising the catalyst, an outlet for a reactor gas, and an outlet for solid carbon and, optionally, the catalyst, wherein the reactor is configured for continuous operation and the inlets and outlets are arranged to enable the catalyst to be conducted in counter-current flow to the feed gas within the reactor zone, and the reactor comprises a cooling zone and a heating zone, said feed gas inlet being provided in the cooling zone.

In the heated reactor, natural gas is continuously conducted over a catalyst. Thereby, methane is cracked, thus forming a mixture of solid carbon, hydrogen and unreacted methane ("reactor gas"). The carbon initially dissolves in the catalyst before crystallizing out of the same. During its transport into the cooling zone, the carbon plus catalyst is continuously cooled, discharged from the reactor, and stored for further utilization. Cooling is effected in the cooling zone of the reactor primarily by the inflowing feed gas. Counter-current flow operation is enabled by sluicing through—and the respective structural measures—, with the catalyst and the feed gas (which is converted to the reactor gas by contacting on the catalyst under reaction conditions) being moved in opposite directions. This offers the essential advantage of an activation of the catalyst. Catalysts, e.g. iron, cobalt or nickel catalysts, reach their activities in the presence of hydrogen. For this reason, hydrogen is added as a reaction trigger in discontinuous methods. The metal-containing catalyst, which is present in its original form as an oxide, will thereby be reduced and only in that state suitable for an oxygen-free cracking process. In the counter-current flow process according to the invention to be performed in the device, the produced hydrogen ensures that an active catalyst will already be available to the inflowing feed gas. For an optimum effect, defined optimized feed gas flow rates and residence times are, therefore, chosen. A further essential characteristic feature resides in the cooling of the produced carbon-catalyst mixture, which is continuously discharged. After discharging from the reactor, no or only marginal cooling measures are required.

After having separated the solid carbon, the discharged catalyst is preferably continuously regenerated and/or recycled, and can be used again. In a particularly preferred manner, this method step can proceed automatically.

In doing so, the catalyst is preferably wet-chemically separated from adhering carbon compounds. It is, moreover, preferred, if the catalyst is chemically separated from adhering carbon compounds, preferably by dissolution in acids. By, e.g., an etching process and subsequent precipitation, the metallic catalysts can be separated and recycled in a simple manner. In the event of earth alkali oxides as carrier materials, in particular MgO, which will be left as a solid after the acid treatment, this can be dissolved, after the separation of the metallic catalyst components, in the presence of ammonia and subsequently precipitated by bases. The thus obtained MgOH can then be converted into the oxide in a calcining step.

It is also beneficial, if the catalyst is physically separated from adhering carbon compounds, preferably by high-temperature treatment (in particular above 2400.degree. C.), heat removal, inductively, by RF or HF. This separation process is particularly gentle for the solid carbon formed as nano-carbon.

In special embodiments, the reactor comprises a preheating zone. This preheating zone is located upstream of the heating zone—in respect to the catalyst flow. The catalyst is continuously heated in the same, is optionally dehydrated and preferably also already contacted with the feed gas so as to be reduced to its active form. In this embodiment, the catalyst is at first introduced into the preheating zone—which may be heated separately or by the waste heat from the heating zone—, then reaches the heating zone, where the catalytic reaction takes place with the formation of solid carbon, and finally the catalyst and the carbon reach the cooling zone, where they are cooled while giving off heat to the feed gas. The preheating zone is preferably configured for operating temperatures of between 100° C. and 900° C. It is particularly preferred if the reactor gas outlet is provided in the preheating zone or in the heating zone, preferably in the preheating zone.

In a preferred manner, the cooling zone is configured for operating temperatures ranging between 100° C. and 600° C., preferably 200° C. and 500° C. This temperature range allows the cracking reaction to already proceed with suitable catalysts, thus enabling cooling of the catalyst and of the solid carbon. In particular embodiments, the cooling zone may also be cooled by the aid of a water cooler—in addition to the cold feed gas.

It is, furthermore, preferred that the heating zone is configured for operating temperatures of between 300° C. and 1400° C., preferably between 500° C. and 1000° C.

This temperature range offers perfect conditions for the decomposition of the feed gas to hydrogen. By selecting suitable temperatures, the growth and structure of nano-carbons can, furthermore, be influenced or even controlled. In this temperature range, Co—, Fe or Ni composite catalysts, which are preferably used according to the invention, have extremely highly efficiencies. The region that exhibits suitable temperature conditions in the interior of the reactor is referred to as the reactor zone.

The solid-carbon outlet or catalyst outlet is provided in the cooling zone. By cooling from optimum reaction conditions (in the heating zone) down to low temperatures, simpler handling will be ensured. Between the heating zone and the cooling zone, a gradually decreasing temperature gradient is provided within the reactor—optionally in the preheating zone.

The catalyst inlet is preferably provided in the heating zone or in the preheating zone. The optionally preheated catalyst is rapidly heated to operating temperature in the heating zone.

The heating zone of the reactor preferably comprises heating rods, heating coils or a gas burner externally. In the cooling zone, a cooler may optionally be arranged, if it is to be expected that insufficient cooling will be provided in the zone by the inflowing feed gas.

The dimension of the heating zone is preferably up to 50%, preferably up to 40%, most preferred up to 30%, of the length of the reactor from the feed gas inlet to the reactor gas outlet. Similarly, the dimension of the cooling zone is up to 50%, preferably up to 40%, most preferred up to 30%, of the length of the reactor from the feed gas inlet to the reactor gas outlet.

The reactor preferably comprises a pressure controller or regulator for an overpressure of 1 to 500 mbar, preferably 50 to 400 mbar, particularly preferred 90 to 250 mbar. The crack reaction can be performed at atmospheric pressure, yet a slight overpressure is applied to avoid the influx of oxygen from the air through untight spots.

The catalyst in the reactor is, in particular, provided on or in a mechanical device preferably selected from a conveyor screw, a drum-type conveyor or a tape run. Such devices or carriers are also suitable for conveying and continuously transporting the catalyst from the heating zone into the cooling zone, and optionally from the preheating zone into the heating zone.

The catalyst is preferably selected from the group consisting of group VIII transition elements, as already pointed out above. In particular, the catalyst preferably comprises a composite structure and at least one group VIII transition element component, preferably Fe, Ni, Co, Mo and/or mixtures thereof, particularly preferred MoCo.

In further preferred embodiments, the composite catalyst comprises an inert component preferably selected from oxides and/or hydroxides of earth alkalis, of silicon, aluminum, boron, titanium or mixtures thereof, wherein caustically burnt magnesia and/or freshly precipitated magnesium hydroxide with a specific surface area of $>1$ $m^2/g$ are particularly preferred. Such catalysts are particularly suitable for the production of filaments from carbon, since the inert component in the interior of the catalyst particle will cause a concentration gradient relative to the carbon metastably dissolved in the metal.

It is preferred, if nickel, cobalt and/or iron are used as a catalyst. The catalysts preferably used according to the invention are based on Ni, Fe and Co and, in an even more preferred manner, have composite character with a component that is inert relative to the decomposition of hydrocarbon.

The catalyst is, in particular, selected from group VIIIB of the Periodic System and, in addition, comprises an f- or d-transition metal preferably selected from vanadium, chromium, manganese, molybdenum, palladium, platinum, or from the group of rare earth metals.

In order to obtain highly pure hydrogen, the device comprises a pressure swing adsorption plant (PSA) downstream of the reactor gas outlet. In the PSA plant, special porous materials are used as molecular sieves to adsorb molecules as a function of their kinetic diameters. In doing so, hydrogen is separated from unreacted feed gas (e.g. methane). Hydrogen can be stored or supplied to a consumer, and the unreacted gas can optionally be burned, e.g. in a torch, to preferably heat the heating zone of the reactor. When the concentration of reaction-affecting gases (e.g. nitrogen) in the unreacted feed gas is sufficiently low for the cracking process, it can be returned to the reactor as a feed gas.

In a special embodiment, the device comprises a filter following the reactor gas outlet and optionally preceding a pressure swing adsorption plant. For the collection of dust particles, a filter is arranged downstream of the reactor in the sense of the feedgas/reactor gas flow.

Downstream of the filter, a reactor gas compressor may be provided (following the reactor gas outlet and optionally a filter, and preceding the PSA plant) to compress the product gas and optionally store it in a tank or feed it to the PSA plant.

Upstream of the reactor, a feed gas flow control and optionally a feed gas compressor are provided (each upstream of the feed gas inlet) to enable the control of the inflow into the reactor.

In a further aspect, the present invention relates to a method for producing a hydrogen-containing gas in a reactor comprising an inlet for a hydrocarbon-containing feed gas, an inlet for a catalyst suitable for cracking hydrocarbons to form hydrogen and solid carbon, a reactor zone comprising the catalyst, an outlet for a reactor gas, and an outlet for the catalyst, characterized in that the reactor is continuously operated in counter-current flow of the feed gas to the catalyst, and the feed gas flow in the direction of the outlet for the reactor gas is heated. In doing so, the catalyst conveyed in the direction of the catalyst outlet, and optionally the produced solid carbon, are preferably cooled in the cooling zone of the reactor as defined above.

The catalytic cracking of the feed gas in the reactor is preferably carried out at an overpressure of 1 to 500 mbar, preferably 50 to 400 mbar, particularly preferred 90 to 250 mbar, in order to prevent air from flowing in.

A further method step for producing pure hydrogen comprises the separation of hydrogen and unreacted feed gas in the reactor gas, e.g. in a PSA plant.

The average residence time of the feed gas in the reactor (reactor volume over catalyst/feed gas flow) in special embodiments is between 5 and 100 seconds, preferably between 5 and 50 seconds, particularly preferred between 5 and 30 seconds, most preferred between 5 and 20 seconds, in particular between 10 and 15 seconds.

In a preferred manner, the entry pressure of the feed gas and the exit pressure of the reactor gas at the reactor are kept substantially equal. In the endothermic crack reaction of methane as the most essential component of natural gas, two hydrogen molecules per methane molecule will occur as a gaseous product. The outflowing gas volume as a characterizing method parameter is, therefore, higher than the volume of the inflowing feed gas at an identical pressure.

According to yet another embodiment of the present invention, natural gas, in particular methane, is used as a feed gas. Natural gas is the cheapest and most readily accessible feed gas variant, it is optionally cleaned from sulfur compounds prior to its use.

It is particularly preferred if an optionally prepurified biogas is used as a feed gas. This comes very close to natural gas in its composition and allows for decoupling from fossil energy carriers.

The catalyst is preferably a nanostructured catalyst on which the feed gas can be reacted to hydrogen and nano-carbon preferably selected from high-quality technical carbon blacks, nanoonions, nanohorns, nanofibers and/or nanotubes.

In a further aspect, the present invention relates to the use of a device as described herein for the production of a hydrogen-containing gas, in particular, according to the method described herein.

The device is preferably used for the direct production of a hydrogen-containing gas at a filling station facility for distribution to a consumer.

In a further aspect, the present invention relates to a filling station facility comprising: an inlet for a hydrocarbon-containing feed gas, a device including a reactor according to the invention or a device as described herein, an exhaust gas line suitable for the transport of hydrogen, a compressor or a cooling device, and a dispensing device suitable for withdrawing either the hydrogen-containing fluid or the hydrogen-containing gas.

In accordance with the invention, these problems can be addressed and eliminated by the filling station or application according to the invention. Preferably, the filling station, and the use for the production at a filling station using the reactor device as herein, are already generally described above.

The filling station or filling station facility suitable for fuelling motor vehicles enables the simple fill-up of hydrogen-operated vehicles or vehicles operated by a hydrogen mixture. According to the invention, the expensive transport of hydrogen will also be avoided by the $CO_2$-poor production in situ. The catalyst is preferably a nanostructured catalyst suitable for the production of nano-carbon. It is, moreover, feasible by the use according to the present invention to produce a gas mixture with a composition selectable by the consumer.

The filling station facility preferably comprises a storage tank for either a cooled liquid hydrogen-containing fluid or a hydrogen-containing gas under pressure, or both.

In preferred embodiments, the filling station facility comprises a mixing device for mixing the hydrogen-containing exhaust gas with a hydrocarbon-containing gas. The mixing device, in a simple manner, enables the preparation and administration of a customized mixture of, for instance, hythane if the hydrocarbon is methane, with a desired portion of hydrogen. The hydrocarbon may, for instance, be available in the form of natural gas or liquefied natural gas or biogas. Mixing may, of course, also take place elsewhere, for instance directly at the dispensing device during the fill-up of a consumer.

In preferred embodiments, the filling station facility comprises a compressor. A suitable compressor allows for the compression of a hydrogen-containing gas for an enhanced inter-mediate storage in a pressure tank.

In a further embodiment, a cooling installation is provided, which is able to convert the exhaust gas from the reactor into a cooled liquid hydrogen-containing fluid.

According to a further preferred embodiment, the reactor comprises a supply and discharge device for the continuous supply and discharge of the catalyst.

In a preferred manner, the filling station facility comprises a steam reformer and/or a PSA plant for the production of pure hydrogen.

The filling station facility preferably also comprises a measuring and dosing device for the customized fuelling of a consumer.

In the following, the invention will be explained in more detail by way of exemplary embodiments with reference to the Figures of the accompanying drawings.

Example 1

$Ni(OH)_2$ was prepared from an aqueous nickel nitrate solution by ammonia precipitation at pH 9. The precipitate was collected in a Buchner funnel, thoroughly washed with deionized water, followed by acetone, and dried at 100° C. for several hours. 4.5 g of the thus prepared $Ni(OH)_2$ powder were suspended in 100 ml acetone under vigorous stirring and then supplemented with 2 ml TEOS (tetraethoxysilane), 5 ml water and 2 ml ammonium hydroxide (25%). The suspension was mechanically stirred overnight so as to ensure that virtually all of the TEOS was homogenously applied as $SiO_2$ on the $Ni(OH)_2$ precipitate. The solid residue was filtered, washed as above, and dried at 120° C. for several hours.

Example 2

200 mg of the composite catalyst were loaded into a ceramic boat, which was inserted into a tubular furnace including a hot zone of 30 cm and equipped with a quartz tube of 40 mm diameter and 1000 mm length. The quartz tube was closed on both ends by suitable closures comprising gas supply and gas outlet means.

The whole system was flushed with pure methane. After having started heating to the CVD reaction temperature of 620° C., a methane gas flow of 90 ml/min was adjusted. The heating rate was 10° C. per minute, and a constant temperature of 620° C. was maintained for 4 hours. When reaching a temperature of 350° C., an increase in the hydrogen content was observed in the exhaust gas. After 20 minutes, and having reached of the reaction temperature, a hydrogen concentration of 68 vol % was measured in the exhaust gas. During the four-hour test period, the hydrogen concentration dropped continuously, still amounting to 51 vol % at the end. After cooling to room temperature, 3.87 g of carbon nanofibers were removed from the reactor.

The measurement of the hydrogen concentration in the exhaust gas of a reformer according to the invention was performed using Calomat 6, a device manufactured by Siemens (DE). From the data acquired by the measurements, the activity of the catalyst can be concluded at any time of the reaction. It is, thus, further possible, by providing a hydrogen sensor in the exhaust gas flow of the reformer and an online evaluation of the acquired hydrogen concentration data, to allow the supply of fresh, unused catalyst, as well as the discharge of used catalyst covered with nano-carbon, to proceed automatically with an existing supply and discharge device for the continuous supply and discharge of catalyst.

Example 3

Figure 4:
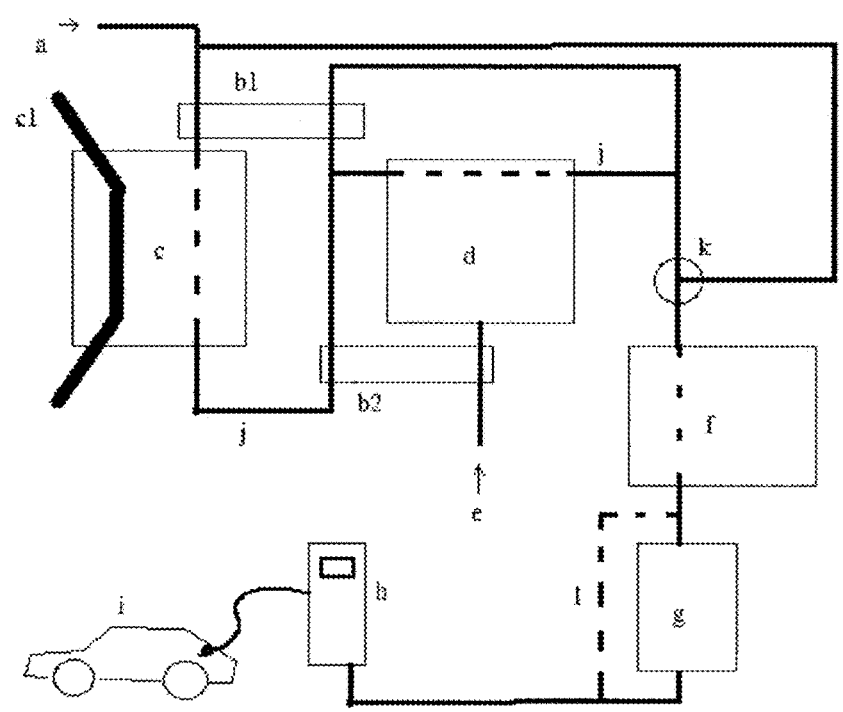
FIG. 4.
Figure 5:
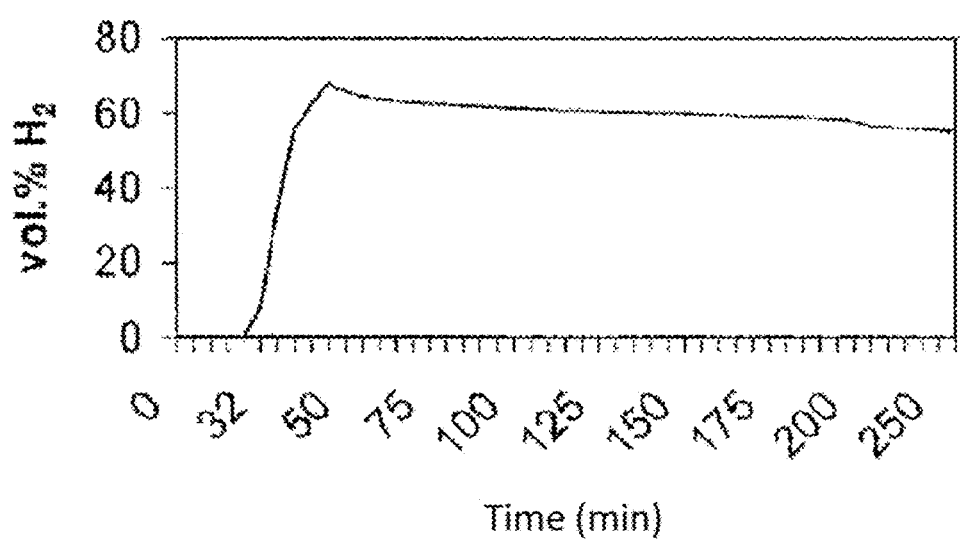
FIG. 5: Course of the hydrogen concentration in the exhaust gas at a discontinuous catalyst supply.

A filling station facility according to the present invention will now be explained in more detail with reference to FIG. 4. This schematic illustration depicts an inlet for a hydrocarbon-containing feed gas (a) into a reformer (c). In the reformer, the feed gas is reacted to hydrogen on a catalyst under reaction conditions. In the present embodiment, the reformer (c) comprises a supply and discharge device (cl) for the continuous supply and discharge of the catalyst. The hydrogen-containing exhaust gas of the reformer is facultatively conducted, via an exhaust gas line (j) that is suitable for the transport of hydrogen, i.e. sufficiently tight, both directly and through a steam reformer (d), via a mixing device (k), into a compressor or a cooling device (f). The feed gas injected into the reformer is preferably preheated via a heat exchanger (b1) by the exhaust gas (j) from the reformer, or from the steam reformer. The steam reformer is equipped with a steam inlet (e). The steam may likewise be preheated via a heat exchanger (b2). A heat exchange (not illustrated) may likewise take place between the reformer (c) and the steam reformer (d) so as to further improve the energy balance. Even the feed gas for the reformer (c) may be additionally or alternatively preheated by direct heat exchange with the steam reformer (d) (not illustrated). From the compressor or the cooling device (f), the hydrogen-containing fuel in compressed or cooled liquid form is conducted either initially into a storage tank (g) or directly, via line (I), to the dispensing device (h), which is suitable for the withdrawal of either the hydrogen-containing fluid or the hydrogen-containing gas. Another fuel line leads from the storage tank to the dispensing device (h). In a known manner, a motor vehicle (i) is filled up at the dispensing device using an integrated measuring and dosing system.

Example 4

Batch Tests

The catalyst (about 200 mg) was loosely poured on ceramic base platelets, inserted in an electrically heated, horizontal tube (4 cm diameter) via its front end, and heated. The surface area covered by the solid was about 5×1 cm.

$CH_4$ at ambient temperature was continuously introduced through several end-side openings at a clear-tube speed in the hot section of about 4 mm/s, and the $H_2/CH_4$ mixture forming was continuously discharged. The hydrogen concentration was measured and the reaction was stopped after the concentration had dropped to about 57 vol. %. Reaction time: about 3.5 hours.

After the reaction and cooling of the tube, the ceramic supports covered with carbon fiber removed again.

Reaction pressure: pressureless to slight overpressure (<100 mbar)

Reaction temperature: 620° C.

Conversion rate (produced mol $H_2$/used mol $CH_4$): about 60% Gas residence time in the reactor (reactor volume above catalyst/natural gas flow): 12.8 s Specific catalyst consumption: 67.5 kg methane used/kg catalyst Example 5

MoCo/MgO Catalyst

Figure 9:
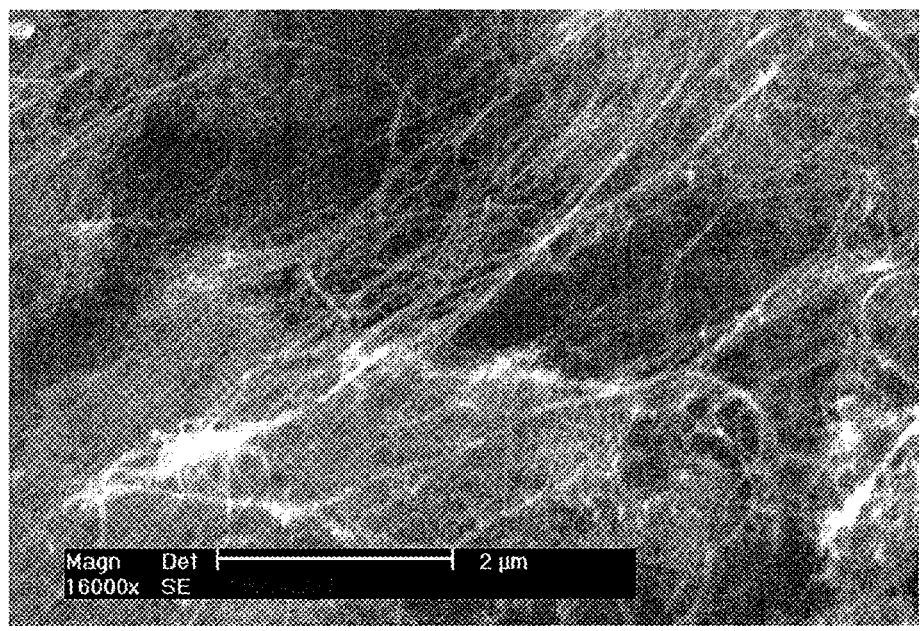
FIG. 9: Nano-carbon fibers wet-chemically separated from MoCo/MgO catalyst (Example 5).

A MoCo powder catalyst was uniformly applied with magnesia on seven stainless steel sheets (l=600 mm, w=100-200 mm, adapted to the internal diameter (210 mm) and the hot-zone length (600 mm) of the tubular reactor) and stacked one above the other within the same. After having closed the tubular furnace, nitrogen was used for inertization, whereupon a gas mixture comprised of 94% methane and 6% hydrogen was introduced. The gas flow was adjusted to 2,500 Nccm and the temperature program was started. The heating rate was 10° C./min and the cracking process temperature was adjusted to 850° C. and maintained for 10 hours. Half an hour after the attainment of the process temperature, the addition of hydrogen was discontinued and the methane flow was readjusted to 2,500 Nccm. The maximum hydrogen concentration in the exhaust gas was measured to be 82 vol % after one hour of reaction; when stopping the reaction after 10 hours, a hydrogen concentration of 43% was determined. After having cooled the reactor, the carbon product uniformly distributed on the sheets and mixed with the employed catalyst, was collected. The catalyst was wet-chemically separated from the nano-carbon (FIG. 9). Weighing of the synthetically produced hydrocarbon yielded 443 g. The mean hydrogen content in the exhaust gas is calculated to be about 70 vol %, based on the used amount of carbon via methane over the total reaction time.

Example 6

Hydrogen Production Plant

Figure 6:
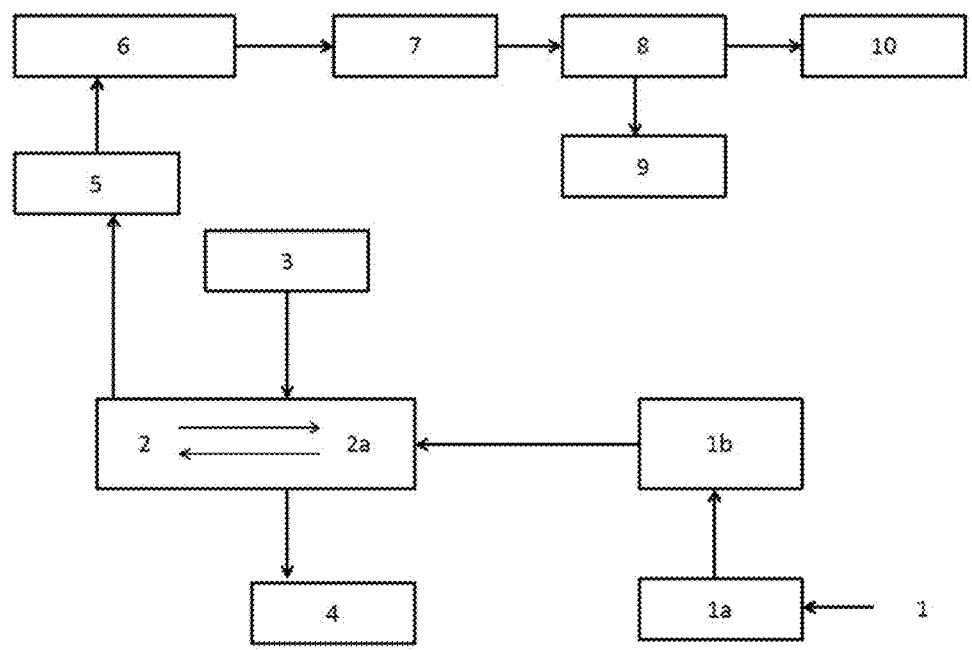
FIG. 6: Schematic illustration of the plant comprising an inlet for a hydrocarbon-containing feed gas (1) and optionally a compressor (1*a*) and a flow regulator (1*b*) for the feed gas; a reactor (2) including a carbon nanotubes (CNT) cooling zone (2*a*); a container for the catalyst (3) and discharged CNT (4); a filter (5), a reactor gas cooler (6), a reactor gas compressor (7), a PSA plant (8) and, optionally, a torch (9) as well as a hydrogen container (10).
Figure 7:
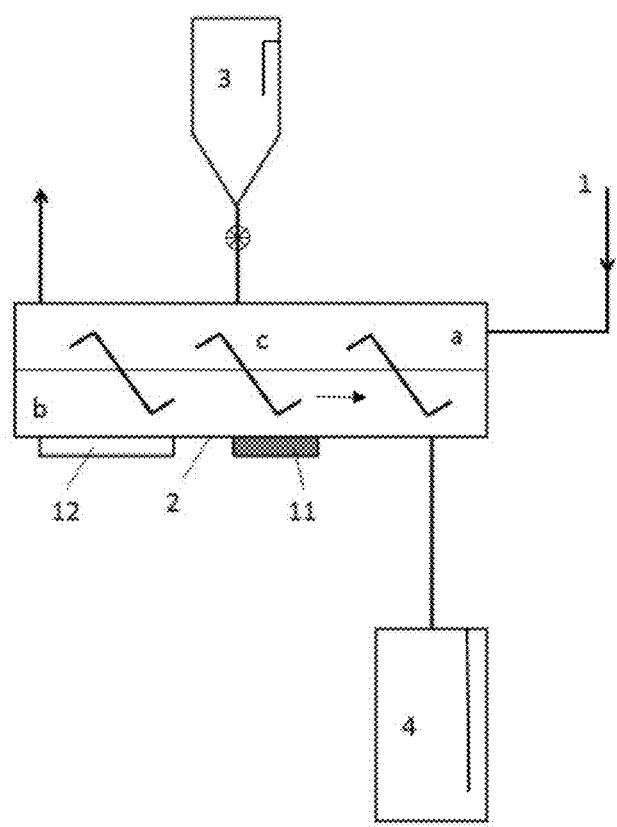
FIG. 7: Schematic illustration of the reactor (2), which is axially subdivided into a heating zone (b) heated by an external heating means (12), a preheating zone (11) and a cooling zone (a) and comprises a rotary conveyor screw (c) with catalyst.

A plant for the production of hydrogen is described with reference to FIGS. 6 and 7. A hydrocarbon-containing feed gas is precompressed through line (1) by a compressor (1a) and conducted into the reactor (2) via a flow regulator (1b). The reactor (2) is axially subdivided into an externally heated heating zone (2b) and a cooling zone (2a) and comprises a conveyor screw (2c), on which the catalyst is conveyed in the direction of the cooling zone. In the cooling zone, the feed gas introduced. Solid carbon is deposited on the catalyst and discharged into a storage tank (4) in the cooling zone after conveyance on the conveyor screw. Fresh catalyst is introduced into the reactor from a storage tank (3) and distributed on the conveyor screw (2c). Formed hydrogen is discharged from the reactor in the heating zone via a filter (5), and compressed in a compressor (7) via a cooler (6), and introduced into the PSA plant (8). In the PSA plant, hydrogen is separated from the residual gas, the latter being burned by a torch (9) and pure hydrogen being stored in a hydrogen tank (10).

Example 7

Flow Operation in the Production Plant

In an electrically heated reactor, natural gas is continuously conducted over a catalyst. In doing so, methane is cracked and a mixture of carbon, hydrogen and unreacted methane is formed. The carbon accumulates on the catalyst in the form of carbon fibers (CNT) and, along with the catalyst, is continuously cooled, discharged from the reactor and stored for further utilization.

The methane-hydrogen mixture forming is filtered, cooled and compressed. The separation of the hydrogen from the residual gas takes place in a PSA (pressure swing adsorption) plant. Pure hydrogen is formed.

The hydrogen is stored in a pressure tank for further use.

The residual gas is burned by a torch or other combustion means.

In the following, the process-relevant normal operation will be described.

Natural Gas Feeding

Natural gas is taken from the mains and compressed to 2 bar by the aid of a reciprocating compressor.

The control of the starting pressure is effected by the aid of a pressure transmitter and bypass adjustment valve to the compressor.

The natural gas flow is governed at the desired level by flow measurement and a flow-control valve.

Reactor

The reactor is comprised of a horizontal, electrically heated tube. The latter is axially subdivided into a heating zone and a cooling zone. On its end side, the natural gas is injected into the cooling zone, flowing to the solid (catalyst+ CNT) in counter-current flow. In the cooling zone, CNT is cooled while the natural gas is preheated. Exit from the reactor occurs at the end side on the hot end of the reactor.

The heating zone is comprised of two separately heatable sections. Heating is effected by the aid of heating cables wound or laid around the reactor. They are protected from overheating by a thermostat. The control of the gas temperature is effected via the heating output.

The catalyst is charged on the hot end of the reactor and conveyed in counter-current flow to the gas, along with the forming carbon fiber, by a slowly rotating conveyor screw (spirally wound steel belt). The screw is driven via a gas-tight shaft and external drive motor including a frequency converter. The conveying speed is adjusted manually.

The reactor comprises inspection glasses with illumination and cleaning means (the dust being blown off by nitrogen) on both ends.

Catalyst Dosing

The catalyst is dosed from an about 50-liter container (stock for about 200 h) by the aid of a cellular wheel sluice. The dosing rate is manually adjusted. The catalyst from the cellular wheel sluice reaches the reactor by gravity.

CNT Discharging

Discharging of the fiber takes place continuously by gravity on the cold end of the reactor via a pneumatically actuated and a manually actuated slide.

The fiber is collected in a collecting container. The container should have a capacity of about 200 liters, corresponding to an 8-hour production. Two containers should be provided; one in operation with the other being conducted to further fiber processing and evacuated.

The containers include inspection glasses with illumination and cleaning means (the dust being blown off by nitrogen). To avoid overfilling, a dead man's button is provided. The filling level is to be checked regularly. If no acknowledgment is issued within about 8 hours, the plant will be shut off automatically.

Reactor Gas Treatment

The reactor gas is freed from dust in a hot-gas filter. The differential pressure on the hot-gas filter is monitored, and nitrogen backflushing will be effected manually if the maximum value is exceeded. The filter is directly arranged on the reactor, and the dust from backflushing is returned into the reactor.

After this, the reactor gas is cooled to a maximum of 30° C. with cooling water in a tubular heat exchanger (gas on the jacket side). The control of the temperature of the gas is effected via a cooling-water flow control valve.

The gas is compressed to about 15 bar by a reciprocating compressor.

The prepressure of the compressor, and hence the pressure in the reactor, is maintained at an overpressure of about 200 mbar by the aid of a prepressure control valve.

PSA Plant

The cooled and compressed reactor gas is supplied to the PSA plant for separating and purifying the hydrogen.

Therein, the reactor gas is alternately conducted, in about 5-minute cycles, through three containers filled with adsorbent. One container is each in adsorption operation, while a second one is in desorption operation (relaxation) and a third one is, at the same time, flushed with hydrogen and repressurized.

Hydrogen Container

The produced hydrogen is stored in an about 5-cm$^3$ container at a maximum overpressure of about 15 bar until further use.

Residual Gas Utilization

Residual gas occurs during the relaxation and flushing of the PSA adsorber and is burned in a torch.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Also, a skilled person in the art will be aware of the prior art which is not explained in the above for brevity purpose.

The invention claimed is:

1. A device for production of a hydrogen-containing gas and a solid carbon, comprising a reactor configured axially, in the form of a horizontally and electrically heated tube, and defining a cavity, the reactor including:
   an inlet for a hydrocarbon-containing feed gas;
   an inlet connected to a source of a catalyst, wherein said catalyst is suitable for cracking hydrocarbons to form hydrogen and solid carbon;
   a reactor zone containing catalyst in the cavity during use;
   an outlet for a reactor gas; and
   an outlet for the catalyst;
wherein:
   the reactor is configured for continuous operation and the inlets and outlets are arranged to enable the catalyst to be conducted in counter-current flow to the hydrocarbon-containing feed gas within the reactor zone;
   the axially configured reactor comprises a cooling zone at one end with a temperature and a heating zone at the opposite end externally heated and with a temperature higher than the temperature of the cooling zone, thus creating a temperature gradient with gradually decreasing temperature gradient from the externally heated heating zone to the cooling zone in the axially configured reactor during use, the hydrocarbon-containing feed gas inlet positioned such that the hydrocarbon-containing feed gas is provided to the cooling zone during operation;
   the device comprises external heating means;
   the external heating means provides heating to the hydrocarbon-containing feed gas and the catalyst in the heating zone, the external heating means selected from a group including heating rods, heating coils or a gas burner, wherein the external heating means is free of the catalyst; and
   the external heating means extends along a length that is less than 50% of a length of the reactor.

2. A device as claimed in claim 1, wherein the reactor includes a preheating zone located upstream of the heating zone, adapted to maintain temperatures ranging between 100-900° C.

3. A device as claimed in claim 2, wherein the reactor gas outlet is in the preheating zone or in the externally heated heating zone.

4. A device as claimed in claim 1, wherein the cooling zone is configured for operating temperatures ranging between 100-600° C.

5. A device as claimed in claim 4, wherein the externally heated heating zone is configured for operating temperatures ranging between 300-1400° C. or 500-1000° C.

6. A device as claimed in claim 1, wherein the outlet for the catalyst and produced carbon are in the cooling zone.

7. A device as claimed in claim 1, wherein the inlet for the catalyst is in the externally heated heating zone or a pre-heating zone.

8. A device as claimed in claim 1, comprising a pressure controller for providing a reactor pressure in a range from 1-500 mbar.

9. A device as claimed in claim 1, adapted to convey catalyst through the reactor in or on a mechanical device during use.

10. A device as claimed in claim 1, wherein the catalyst assumes a composite structure.

11. A device as claimed in claim 10, wherein the catalyst comprises oxides and/or hydroxides of earth alkalis, silicon, aluminium, boron, titanium, and/or mixtures thereof.

12. A device as claimed in claim 11, wherein the catalyst comprises caustically burnt magnesia and/or freshly precipitated magnesium hydroxide with a specific area of >1 m$^2$/g.

13. A device as claimed in claim 10, wherein the catalyst is a nanostructured catalyst.

14. A device as claimed in claim 1, wherein the catalyst comprises an f- or d-transition or a rare earth metal, selected from a group including iron, nickel, cobalt, vanadium, chromium, manganese, molybdenum, palladium, platinum, molybdenum/cobalt, or mixtures thereof.

15. A device as claimed in claim 1, further comprising a pressure swing adsorption plant downstream of the reactor gas outlet.

16. A device as claimed in claim 1, further comprising a filter downstream of the reactor gas outlet, wherein the filter precedes a pressure swing adsorption plant.

17. A device as claimed in claim 1, further comprising a reactor gas compressor downstream of the reactor gas outlet.

18. A device as claimed in claim 1, configured such that the hydrocarbon-containing feed gas has an average residence time in the reactor of between 5 and 100 seconds during operation.

19. A device as claimed in claim 1, wherein the reactor:
includes a mechanical carrier for conveying and continuously transporting the catalyst within said reactor;
said reactor is configured such that the nano-carbon product produced is adapted to react with carbon dioxide for oxidizing or surface modifying said nanocarbon product; and
said device is provided with a steam reformer for receiving steam for increasing production of hydrogen before harvesting the reactor gas.

20. A method for producing a hydrogen-containing gas in a reactor comprising:
obtaining a device as claimed in claim 1;
heating the catalyst in the externally heated heating zone; and
operating the reactor to bring about a counter-current flow of hydrocarbon-containing feed gas relative to catalyst flowing in a direction towards the outlet for the reactor gas.

21. A device as claimed in claim 1, wherein the externally heated heating zone is configured for operating temperatures ranging between 300-1400° C. or 500-1000° C.

* * * * *